United States Patent [19]

Herrin

[11] 4,130,070

[45] Dec. 19, 1978

[54] LINEARLY TRANSLATABLE TABLE TOP

[76] Inventor: Cline E. Herrin, 1666 Dike Rd., Mount Vernon, Wash. 98273

[21] Appl. No.: 858,736

[22] Filed: Dec. 8, 1977

[51] Int. Cl.² ............................................ A62B 35/00
[52] U.S. Cl. .................................... 108/143; 297/158
[58] Field of Search ................. 108/137, 140, 143, 85,
108/102, 5; 297/158; 269/322, 323; 308/3.6,
3.8; 248/430, 429, 424; 312/333

[56]  References Cited
U.S. PATENT DOCUMENTS

| | | | |
|---|---|---|---|
| 2,509,332 | 5/1950 | Budd | 297/158 X |
| 2,676,858 | 4/1954 | Duncan | 308/3.6 |
| 2,731,317 | 1/1956 | Duncan | 308/3.6 X |
| 2,864,656 | 12/1958 | Yoricks | 308/3.8 |
| 3,646,623 | 3/1972 | Harris et al. | 248/408 X |
| 3,702,209 | 11/1972 | Moore | 108/102 X |
| 3,966,050 | 6/1976 | Dahl | 108/102 X |
| 3,987,888 | 10/1976 | Wickam | 108/143 X |
| 4,019,443 | 4/1977 | Jones | 108/137 |

Primary Examiner—James T. McCall
Attorney, Agent, or Firm—Christensen, O'Connor, Johnson & Kindness

[57] ABSTRACT

In a table having a stationary base, a table top linearly translatable with respect to the base is disclosed. The table top translates on a roller and rail assembly located intermediate the table top and a base plate that is affixed to the table base. The table top translates along the extension of the rails and structure is also included for releasably locking the table top in any one of a plurality of predetermined positions.

8 Claims, 6 Drawing Figures

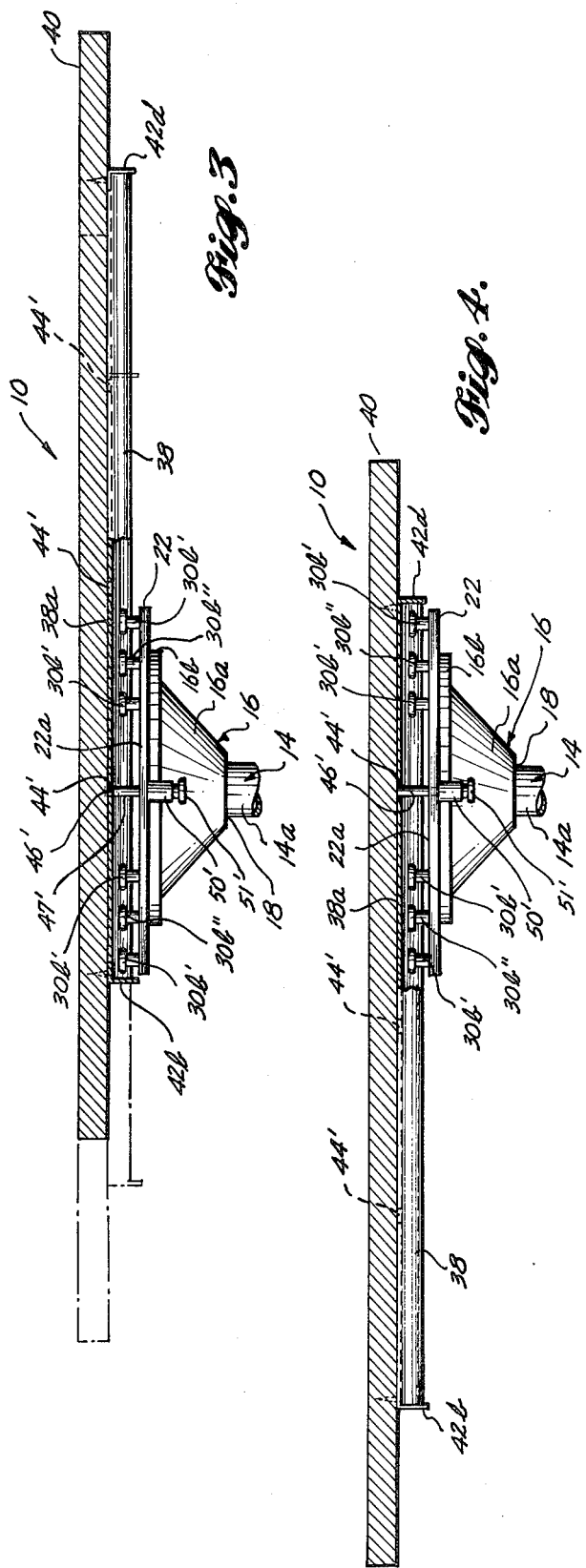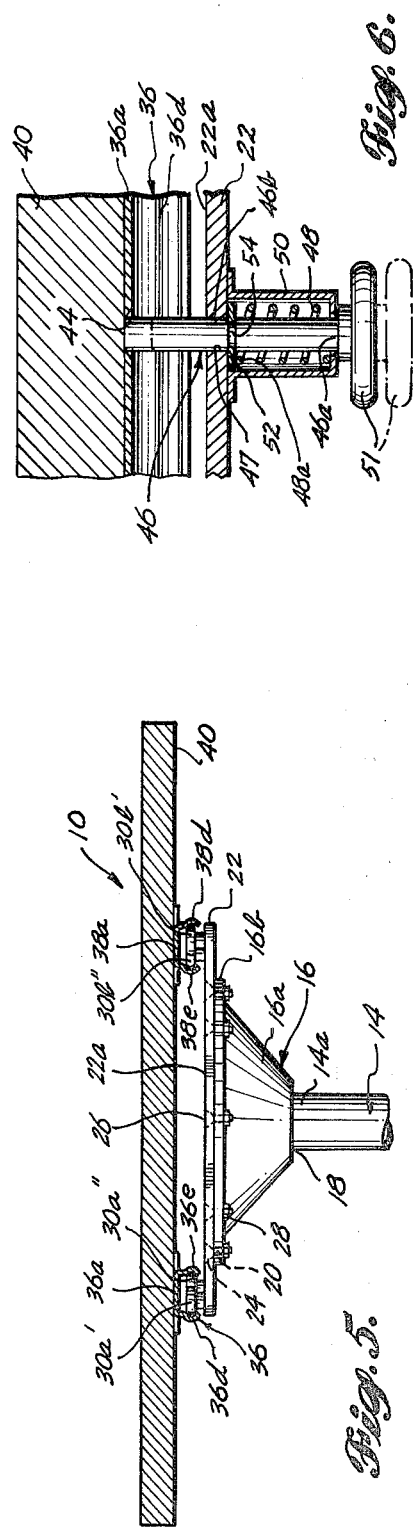

LINEARLY TRANSLATABLE TABLE TOP

BACKGROUND OF THE INVENTION

This invention relates to furniture and more particularly to tables having linearly translatable table tops which can be locked in any one of a plurality of positions.

Many times it is necessary or desirable to have a table located in an area of restricted space. The space restriction makes access to the area surrounding the table difficult. Access could be provided by moving the table temporarily; however, this may not be possible in an environment which also requires that the table be secured to the floor. One example is in the dining area of a recreational camper vehicle. In a camper, the dining area typically consists of a base seat which is U-shaped as viewed in plan. A dining table is located within the "U" and is securely mounted to the floor to prevent movement of the table while the camper is in motion. Due to the space limitations of a camper, the space between a top of the dining table and the seat is small. The small space makes it difficult for a person to gain access to the seat, particularly the rear bridging section of the U-shaped bench at the rear of the table. If the person is large, it is also uncomfortable to sit at the table after access is gained. Also, typically camper vehicles have cabinets located overhead to conserve floor space. Many times there are a set of cabinets immediately over the dining area. The dining table extends partly into the passageway which makes it difficult to reach over the table top to gain access to the overhead cabinet. It is therefore desirable to have a table top which can be moved to accommodate the user, either by giving him or her more access to seating or easier access to the overhead space above the table.

Tables with movable tops are known in the prior art. However, most prior art table tops are of complicated design and most need to be installed with a particular base associated with a particular table top. The need for a particular type of base installation is a major disadvantage since it makes it more costly and requires more effort to install the sliding table top in an existing camper vehicle as a replacement for a stationary table top.

It is therefore an object of this invention to provide in a table having a base an improved table top which is linearly translatable relative to the base.

It is a further object of this invention to provide a sliding table top which can be installed on the same base as an existing stationary table top with relatively little expense.

It is another object of this invention to provide a sliding table top which can be locked into one of a plurality of positions.

SUMMARY OF THE INVENTION

In accordance with the foregoing objects, an apparatus is provided for mounting a planar table top on the base so as to permit the table top to translate linearly with respect to the base. The mounting apparatus includes a base plate which is affixed to the base and a plurality of rollers mounted for rotation on a first surface of the base plate. The axes of rotation of the rollers are substantially orthogonal to the first surface of the base plate and the rollers are arranged in a first and second group such that the axes of rotation of the rollers in the first group describe a first line and the axes of rotation of the rollers in the second group describe a second line, the first and second line being in parallel spaced relation to one another. A pair of elongate rails are affixed to a first surface of the table top in parallel spaced relation and are positioned so that when the table top overlies the base plate the first group of rollers engages one of the rails and the second group of rollers engages the other of the rails whereby the table top can be translated linearly along the rails relative to the base.

In a further embodiment of the invention, a locking means is provided for selectively securing the table top in any one of a plurality of positions relative to the base.

In a still further embodiment of the invention, each of the first and second groups of rollers is further arranged in a first and second subgroup. The rollers of the first subgroup are aligned and the rollers of the second group are aligned. The alignment being such that when the group of rollers engages the rail, the rollers of the first subgroup contact a first side of the rail while the rollers of the second subgroup contact a second, opposing side of the rail. The subgroup arrangement provides a more even distribution of forces along the rail thereby allowing the table top to translate with a minimum of binding.

It will be appreciated from the foregoing brief summary that the invention provides in connection with a table having a base, a table top which translates linearly with respect to the base and which can be locked into any one of a plurality of fixed positions. The table is useful for small spaces to allow easy access to and egress from the table and to allow the table top to be moved away from a position which would obstruct access to an area above the table.

BRIEF DESCRIPTION OF THE DRAWINGS

FIG. 3 is a side view of the table of FIG. 1 in cross section along the lines 3—3 in FIG. 2.

FIG. 4 is a side elevational view of the table top in FIG. 1.

FIG. 5 is an end view of the table of FIG. 1 cross section along the line 5—5 in FIG. 2.

FIG. 6 is a side view of cross section of a table top locking mechanism made in accordance with the principles of this invention.

DESCRIPTION OF THE PREFERRED EMBODIMENT

Although a preferred embodiment of the table top mounting apparatus provided by the present invention was designed for use in a recreational camper vehicle and will be described herein in that environment, it will be appreciated by those skilled in the art that the linearly translatable table top is useful in other environments as well. The table top and mounting apparatus disclosed in the present invention is useful in any environment in which it is desired to place a table in a small confined area, for example, a breakfast nook in a house or in a restaurant to make it possible to fit a greater number of booths and tables into a given space. The linearly translatable table top is also useful in environments which do not involve a table per se, but rather a flat work surface, for example, the mounting apparatus of this invention could be used to mount a cutting board which slides out from and back into a kitchen cupboard.

Figure 1:
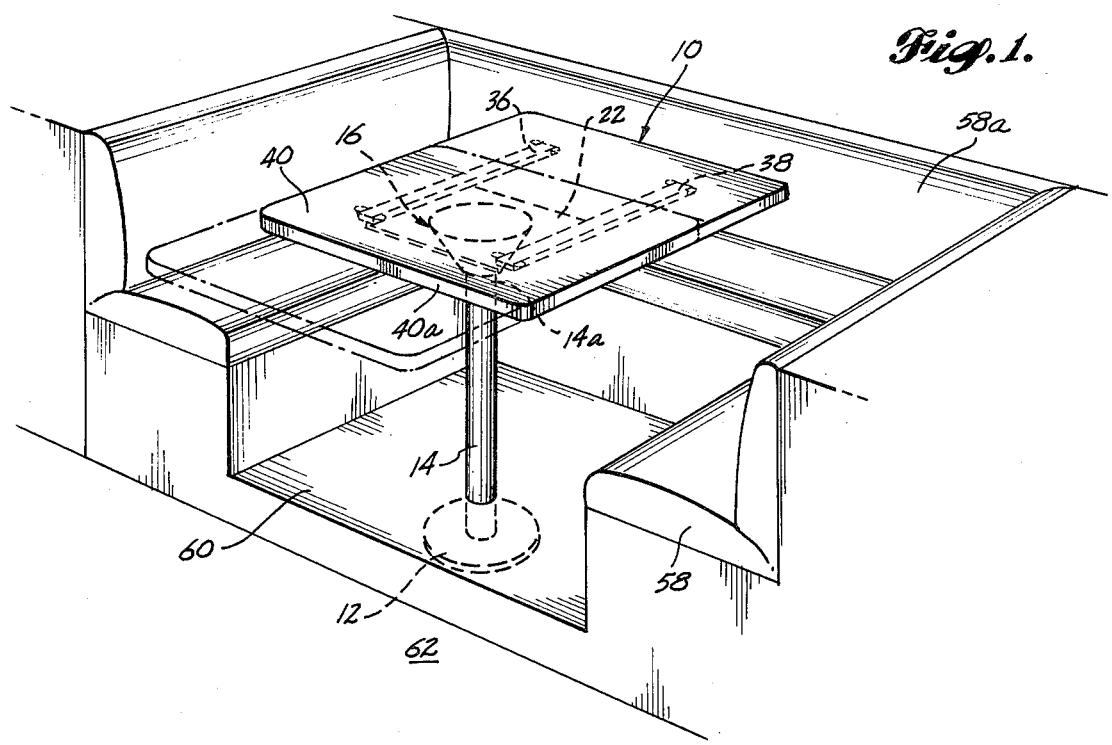
FIG. 1 is a isometric view of a table having a table top made in accordance with the principles of this invention.
Figure 2:
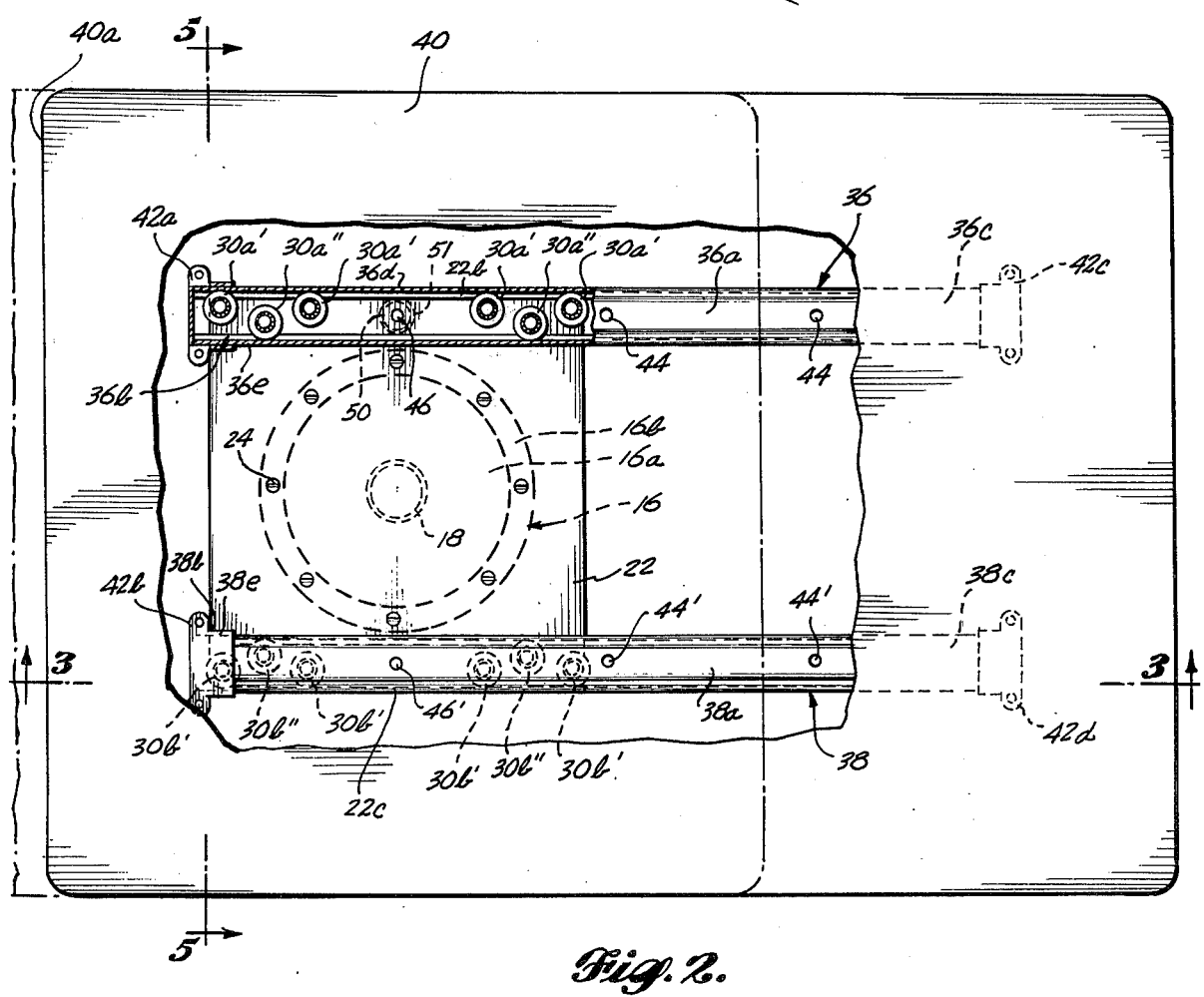
FIG. 2 is a plan view of the table of FIG. 1 with a portion cutaway to show the mounting of the table top to the base.

FIG. 1 is an isometric view of a table having a linearly translatable table top made in accordance with the principles of this invention. The table 10 comprises a base 12 upon which is mounted a vertical support pipe 14. At an upper end 14a of the support pipe 14 is mounted a table support 16. As shown in FIGS. 2 and 5 the table support 16 has a first portion 16a which is conical in shape and has an aperture 18 through it into which the upper end 14a of the support pipe 14 is inserted. The table support 16 is fastened to the support pipe 14 by some suitable means such as welding. A flange portion 16b projects outwardly around the upper edge of the table support 16 and has a plurality of circumferentially located holes 20 formed in it. A substantially rectangular base plate 22 overlies the flange portion 16b of the table support 16. The base plate 22 has a plurality of holes 24 therethrough corresponding in location to the holes 20 in the flange portion 16b of the table support 16. The corresponding holes 20, 24 in the base plate 22 and the flange 16b are aligned and a machine screw 26 is inserted through each associated pair of aligned holes 20, 24 and fastened by a nut 28. The holes 24 in the base plate 22 are countersunk and the heads of the machine screws 26 are correspondingly beveled such that when the screw is placed into the holes 20, 24 the top of the machine screw heads are flush with an upper surface 22a of the base plate 22.

A plurality of rollers, generally designated as 30, are rotatably mounted on the upper surface of the base plate having their planes of rotation parallel to the base plate upper surface 22a. The rollers 30 are arranged in a first and a second group, the rollers of the first group being designated as 30a and the roller of the second group being designated as 30b. The rollers 30a of the first group are aligned generally along a first edge 22b of the base plate 22 and the rollers 30b of the second group are aligned generally along an opposing edge 22c of the base plate 22. Preferably the rollers 30a and 30b of the first and second in each group are further arranged in a first subgroup 30a' or 30b' respectively and a second subgroup 30a" or 30b" respectively with the rollers 30a' or 30b' in the first subgroups aligned adjacent the associated edge 22b or 22c and the rollers 30a' and 30b' in the second subgroups aligned parallel to and inwardly of the rollers 30a' or 30b' first subgroups. The distance between the lines described by the axes of rotation of the two subgroups of rollers is less than the width of any one of the rollers 30. The purpose of the subgrouping is explained below. In the preferred embodiment of the table 10 illustrated there are six rollers 30 in each 30a, 30b with four rollers in each of the first subgroups 30a', 30b' and two rollers in each of the second subgroups 30a", 30b". However, it is to be understood that the total number of rollers as well as the number of rollers in a given group or subgroup can be varied as desired while remaining within the scope of the present invention. The orientation of the rollers 30 on the base plate 22 can be best seen in FIG. 2.

A first elongate rail 36 and a second elongate rail 38 are attached in parallel spaced relation to the underside of a table top member 40 by suitable means such as screws, adhesive, or nails. The rails 36, 38 are generally C-shaped in cross section and open away from the table top 40. The rails 36, 38 are flattened in a first portion 36a, 38a which forms the area of attachment of the rails 36, 38 to the table top 40. The table top 40 overlies the base plate 22 and is supported on the rails 36 and 38 which are in turn supported by the rollers 30. The table top 40 is located on the base plate 22 such that the first group of rollers 30a rides within the first rail 36 and the second group of rollers 30b rides within the second rail 38, thereby allowing the table top 40 to translate along the extension of the rails 36, 38. Preferably an end plates 42a, 42b, 42c, 42d are fixed to first ends 36b, 38b and second ends 36c, 38c of each of the rails 36, 38 to close the ends and prevent the rollers 30 from coming out of the rails 36, 38. The roller perimeters ride along the sides of the rails 36, 38 and the width of the rails and the offset of the groups of rollers are arranged so that the perimeters of the rollers 30a', 30b' of the first subgroup contact a first side 36d, 38d of the rails 36, 38 and the perimeters of the rollers 30a", 30b" of the second subgroup contact a second opposing side 36e, 38e of the rails 36, 38. The rollers 30 and rails 36, 38 are so arranged to provide a more even distribution of forces thereby preventing binding of the rollers 30 within the rails 36, 38 during translation of the table top 40.

A plurality of holes 44 are formed in the flat first portion 36a of the rail 36 spaced along the extension thereof normal to the table top 40. The holes 44 are arranged to cooperate with a lock pin 46 which extends above the base plate 22 to selectively hold the table top 40 in one of a plurality of fixed positions as determined by the number and spacing of the holes 44. The lock pin 46 is inserted through a hole 47 formed in the base plate 22 in general alignment with the rollers 30. The pin 46 can be moved in and out of engagement with the holes 44 in the rail 36. The lock pin 46 is biased into engagement with the holes 44 in the rail 36 by means of a coil spring 48 which surrounds the portion of the lock pin 46 which extends below the base plate 22. A housing 50 encases the coil spring 48 and keeps it captive around the pin 46. The housing 50 also provides a means of mounting the pin 46 on the base plate 22. The pin 46 has a disc portion 51 attached to a first end 46a of the pin 46 nonadjacent the rail 36. The disc portion 51 provides a convenient means of gripping the pin 46 to move it into and out of engagement with the holes 44. An E-ring 52 is inserted in a circumferential groove 54 formed in the surface of the lock pin 46 near a center portion 46b of the lock pin 46. The E-ring 52 abuts a first end 48a of the spring 48 adjacent the base plate 22 providing a stop for the coil spring 48. The arrangement is such that when the pin 46 is pulled out of engagement with the hole 44 in the rail 36, the spring 48 is compressed. When the table top 40 has been moved to its desired position, the pin 46 is released and the spring 48 expands forcing the pin 46 upward into engagement with the selected hole 44 thereby locking the table top 40 in the desired position. A second lock pin 46' can be similarly placed in the base plate 22 to cooperate with holes 44' formed in the second rail 38.

The dining alcove of a typical camper vehicle as viewed in plan comprises a U-shaped seat 58 with a table 10 located in the center thereof. FIG. 1 shows a table 10 made in accordance with the principles of this invention installed in such a dining alcove. Referring to FIG. 1, the seat 58 rests on a ledge 60 which in turn is supported by the floor 62 of the camper. The table 10 is located forward of a rear bridging section 58a of the seat toward a passageway in the camper. The table 10 is oriented such that the rails 36, 38 run forwardly and rearwardly between the passageway and the seat section 58a. In its normal position, a forward edge 40a of the table top 40 extends into the passageway. As a result, it is difficult for a person to stand on the floor 62 and reach a cabinet (not shown) located above and to the rear of the table 10. The locking pins 46, 56 in the base plate 22 can be released and the table top 40 moved toward the rear seat section 58a thereby permitting easier access to the cabinet.

Also the space constraints of the camper necessitates the table 10 being located near the seat 58. It is difficult for a large person (not shown) to maneuver behind the table 10 to the rear seat section 58a, and once seated at the rear of the table 10 too little room is available for comfortable dining. To accommodate a large person, the table top 40 can be moved to a forward position extending further into the passageway thereby creating more space between the table top 40 and the rear seat section 58a.

In summary, a table top assembly is provided for use with a table having a base, which top is linearly translatable with respect to the base. The table top translates along the extension of a pair of parallel-spaced elongate rails attached to the underside of the table top member, which rails ride on a plurality of rollers mounted on a base plate fixed to the table base. At least one spring biased locking pin is provided to selectively lock the table in any one of a plurality of positions.

Although the table top provided by this invention has been described and illustrated in a recreational camper environmental, it will be appreciated by those skilled in the art and others that the above described table top can be used in any environment in which it is desirable to have a table surface which is translatable, such as in a breakfast nook in a home or in a cutting board which slides in and out of a kitchen cabinet. Many variations can be made in embodiments of the invention, for example, varying the number of rollers or using a different biasing means for a lock pin or placing the table top on a different type of table base while remaining within the scope of the present invention; hence, the invention can be practiced otherwise than as described herein.

The embodiments of the invention in which an exclusive property or privilege is claimed are defined as follows:

1. For use with a table having a base, a fixed horizontal support plate mounted on the base and a planar table top overlying the support plate, an apparatus for mounting the table top on the base so as to permit linear translation of the table top relative to the base, comprising:
   a base plate;
   first means for affixing said base plate to the horizontal support plate;
   a plurality of rollers mounted on a first surface of said base plate, each of said rollers having an axis of rotation substantially orthogonal to said first surface, said rollers being arranged in a first and a second group, the rollers of the first group being aligned so that their axes of rotation describe a first line and the rollers of the second group being aligned so that their axes of rotation describe a second line, said first and second lines being in parallel spaced relation to one another; and,
   a first elongate rail and a second elongate rail to be affixed to a first surface of the table top is substantially parallel spaced relation to one another so that when the table top overlies said support plate, said first group of rollers is received in said first rail and said second group of rollers is received in said second rail whereby the table top can translate along said rails relative to the base.

2. The apparatus of claim 1 wherein each of said first and second groups of rollers is further arranged in a first and a second subgroup, the rollers of said first subgroup being aligned and the rollers of said second subgroup being aligned, the relation of said first subgroup to said second subgroup being such that when said first and second groups of rollers are received in the associated first and second rails, the perimeters of the rollers of said first subgroup contact a first side of said associated rail and the perimeters of the rollers of said second subgroup contact a second opposing side of said associated rail.

3. The apparatus of claim 1 further comprising second means associated with said base plate and said rails, such second means being selectively operable to lock said table top in one of a plurality of positions relative to said base.

4. The apparatus of claim 3 wherein said first rail has a plurality of spaced holes formed along the elongate dimension normal to said first surface of the table top and wherein further said second means comprises: a locking pin extending from said first surface of said base plate, said locking pin being movable into or out of engagement with said spaced holes; and, first biasing means associated with said pin for biasing said pin into engagement with said spaced holes.

5. The apparatus of claim 4 wherein said locking pin has an upper portion extending above said base plate, a lower portion extending below said base plate and a radially inwardly extending groove formed in said lower portion of said pin adjacent said base plate and wherein further said first biasing means comprises:
   a coil spring substantially surrounding said lower portion of said locking pin, said spring having a first and a second end, said first end of said spring being adjacent said groove;
   a casing surrounding said spring and said pin, said casing having a first and a second end, said first end being affixed to said base plate and said second end abutting said second end of said spring;
   an E-ring mounted in said groove and abutting said first end of said spring whereby when said pin is moved in a direction away from said table top said spring is compressed between said E-ring and said second end of said casing so that when said pin is released said spring expands pushing said E-ring and in turn said locking pin in a direction toward said first rail.

6. The apparatus of claim 5 wherein said second rail has a plurality of spaced holes formed therein along the elongate dimension of said rail normal to said first surface to said table top and further including a second locking pin extending from said first surface of said base plate moveable into and out of engagement with said spaced holes in said second rail and second biasing means identical to said first biasing means associated with said second locking pin for biasing said second pin into engagement with said spaced holes in said second rail.

7. The apparatus of claim 1 wherein each of said first and second rails is substantially C-shaped in transverse section, said first and second rails opening away from said first surface of the table and being curved to closely conform to the shape of that portion of said rollers that contact said rails so as to substantially eliminate movement of said rollers in a direction transverse to the elongate dimension of said rails.

8. In a table having a base, a single vertical support column mounted on said base, a fixed horizontal support plate mounted on said vertical column and a planar table top overlaying said support plate, the improvement comprising an apparatus for mounting the table top so as to permit linear translation of the table top relative to the base including a base plate, first means for affixing said base plate to said horizontal support plate, a plurality of rollers mounted on the first surface of said base plate, each of said rollers having an axis of rotation substantially orthogonal to said first surface, said rollers being arranged in a first and a second group, the rollers of the first group being aligned so that their axes of rotation describe a first line and the rollers of the second group being aligned so that their axes of rotation describe a second line, said first and second lines being in parallel spaced relation to one another, and a first elongate rail and a second elongate rail to be affixed to a first surface of said table top in substantially parallel spaced relation to one another such that when the table top overlies said support plate, said first group of rollers is received in said first rail and said second group of rollers is received in said second rail whereby the table top can translate along said rails relative to the base.

* * * * *

UNITED STATES PATENT AND TRADEMARK OFFICE
CERTIFICATE OF CORRECTION

PATENT NO. : 4,130,070

DATED : December 19, 1978

INVENTOR(S) : Cline E. Herrin

It is certified that error appears in the above-identified patent and that said Letters Patent are hereby corrected as shown below:

Column 3, line 35, delete "roller" and insert --rollers--;
       line 40, after "30b" insert --in each--;
       line 41, after "second" delete "in each";
       line 47, after "30b" insert --of the--;
       line 52, after "each" insert --group--.
Column 4, line 7, after "Preferably" delete "an".

In the Claims:   Column 5, line 64, delete "is" and insert --in-- . (Claim 1)
Column 5, line 63, after "rail" (second occurrence) delete "to be". (Claim 1)
Claim 2, Col. 6, line 5, after "of" insert --each of--;
       line 5, delete "subgroup" (second occurrence) and insert --subgroups--;
       line 6, after "of" insert --each of--;
       line 6, delete "subgroup" and insert --subgroups--;
       line 7, after "of" insert --each of--;
       line 7, delete "subgroup" and insert --subgroups--;
       line 7, delete "said" (second occurrence) and insert --its associated--;
       line 9, delete "the" and insert --their--;
       line 11, delete "subgroup" and insert --subgroups--;
       line 13, delete "subgroup" and insert --subgroups--.
Claim 3, Col. 6, line 17, delete "such" and insert --said--.
Claim 4, Col. 6, line 26, after "with" insert --a selected one of--;
       line 27, after "said" (first occurrence) insert --locking--;
       line 27, after "said" (second occurrence) insert --locking--;
       line 28, after "said" insert --selected one of said--.
Claim 5, Col. 6, line 33, after "said" (first occurrence) insert --locking--;
       line 39, after "said" (second occurrence) insert --locking--;
       line 44, after "said" (second occurrence) insert --locking--;
       line 47, after "said" (second occurrence) insert --locking--;
       line 48, after "expands" insert --,--.

UNITED STATES PATENT AND TRADEMARK OFFICE
CERTIFICATE OF CORRECTION

PATENT NO. : 4,130,070

DATED : December 19, 1978

INVENTOR(S) : Cline E. Herrin

It is certified that error appears in the above-identified patent and that said Letters Patent are hereby corrected as shown below:

Claim 6, Col. 6, line 56, after "plate" insert —, said second locking pin being—;
　　　　　line 56, after "with" insert —a selected one of—;
　　　　　line 57, after "rail" insert —,—;
　　　　　line 58, after "means" (both occurrences) insert —,—;
　　　　　line 59; after "second" (second occurrence) insert —locking—;
　　　　　line 60, after "said" (first occurrence) insert —selected ones of said—
Claim 8, Col. 8, line 6, after "rail" (second occurrence) delete "to be".

Signed and Sealed this

Fifth Day of June 1979

[SEAL]

Attest:

RUTH C. MASON
Attesting Officer

DONALD W. BANNER
Commissioner of Patents and Trademarks